Jan. 31, 1928.  
C. CAMPBELL  
1,658,022  
RECORD CARD CONTROLLED STATISTICAL MACHINE  
Filed April 10, 1925  
4 Sheets-Sheet 1
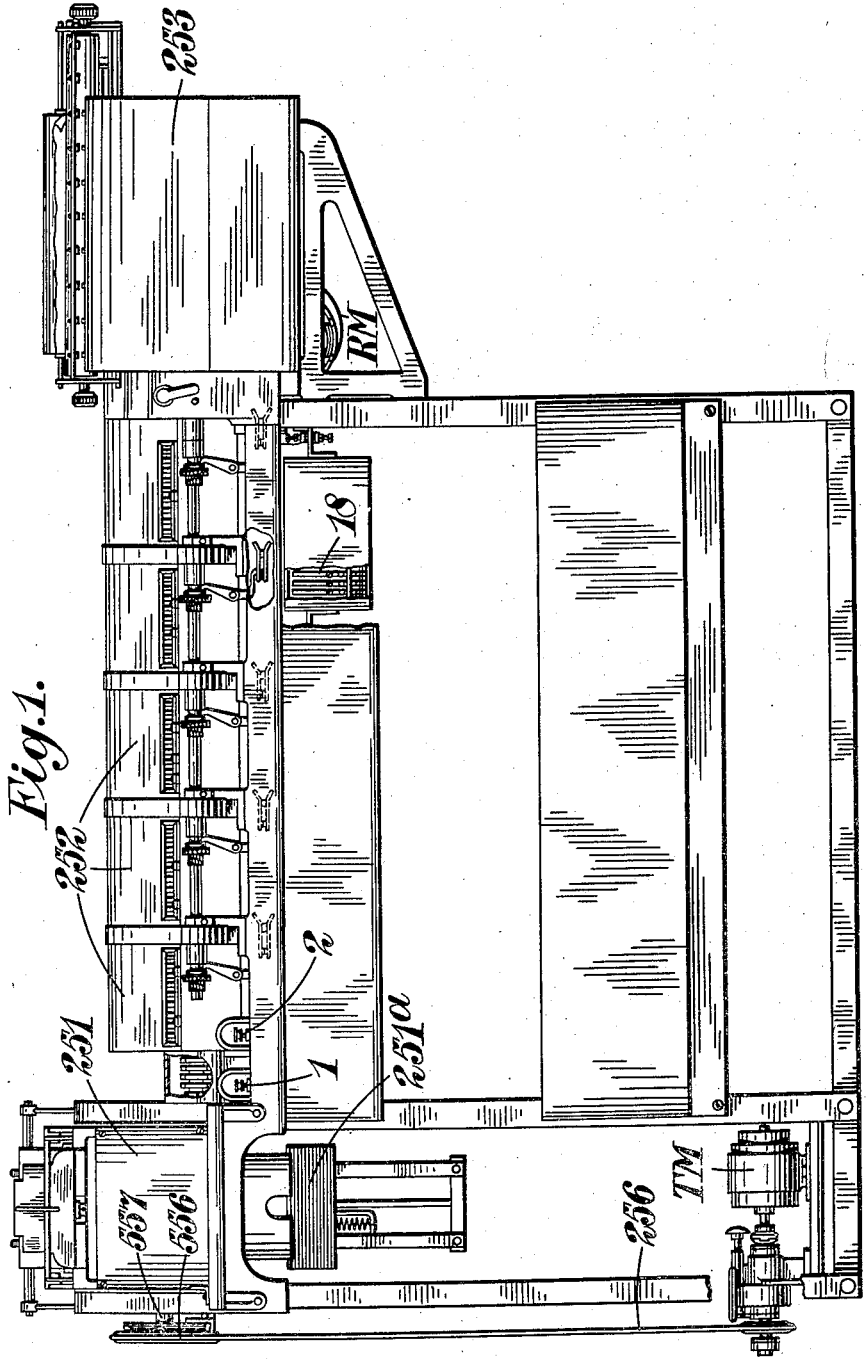

Jan. 31, 1928.
C. CAMPBELL
1,658,022
RECORD CARD CONTROLLED STATISTICAL MACHINE
Filed April 10, 1925      4 Sheets-Sheet 2
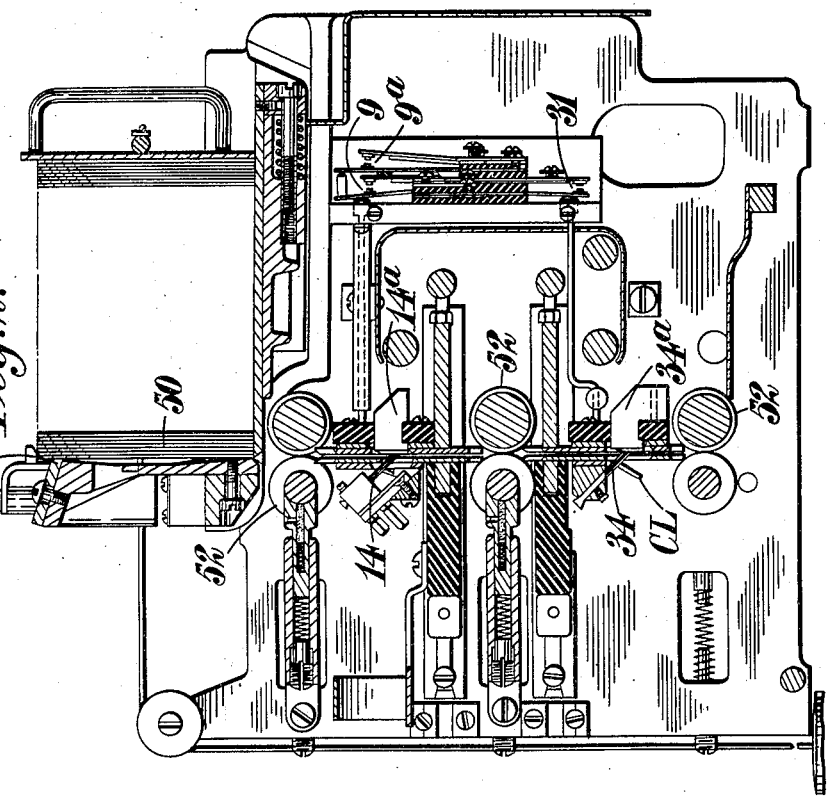
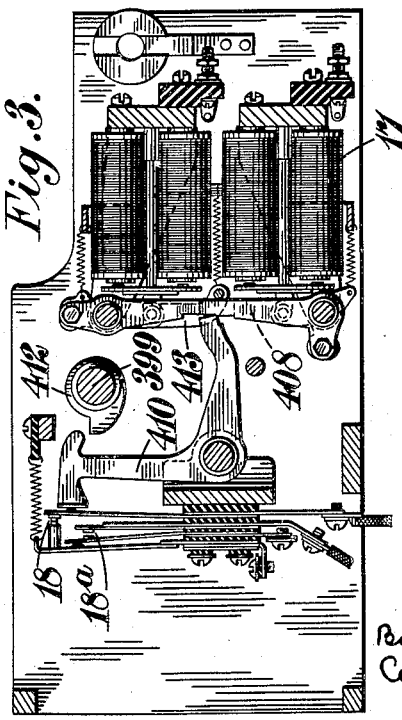
Inventor
Charles Campbell
By his Attorneys
Cooper, Kerr & Dunham

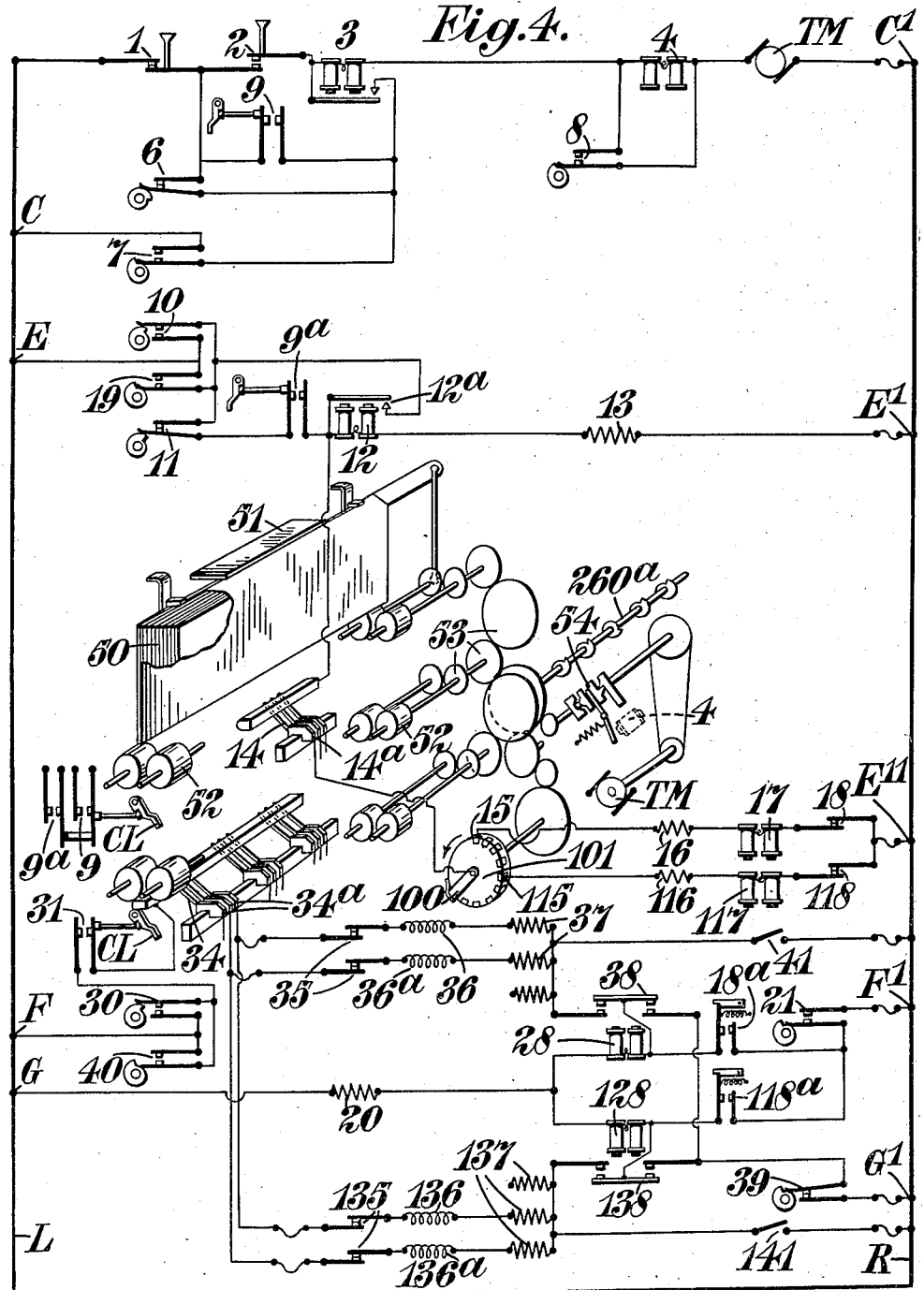

Jan. 31, 1928.  1,658,022
C. CAMPBELL
RECORD CARD CONTROLLED STATISTICAL MACHINE
Filed April 10, 1925    4 Sheets-Sheet 4

Inventor
Charles Campbell
By his Attorneys
Cooper, Kerr & Dunham

Patented Jan. 31, 1928.

1,658,022

UNITED STATES PATENT OFFICE.

CHARLES CAMPBELL, OF LONDON, ENGLAND, ASSIGNOR TO THE TABULATING MACHINE COMPANY, OF NEW YORK, N. Y., A CORPORATION OF NEW JERSEY.

RECORD-CARD-CONTROLLED STATISTICAL MACHINE.

Application filed April 10, 1925, Serial No. 22,118, and in Great Britain June 13, 1924.

Record-card-controlled statistical machines such as the well-known Hollerith machines comprise means for "reading" the perforations in the cards, counters, printing devices or other registering or recording means, and operative connections between the reading means and the registering or recording means whereby the latter are caused to register or record the statistics represented by the perforations on the cards. The cards are usually provided with certain special perforations which do not represent statistics but determine by their position the groups, class or other category to which the statistics relate, and these "designating" perforations are sometimes employed in conjunction with so-called "automatic control" devices to bring about a change (for example a stoppage) in the operation of the machine, for which purpose the cards are sorted into groups (in accordance with the designating perforations) before being passed through the machine, the arrangement being such that while cards having the same designating perforations are passing through the machine normal conditions are maintained, while when a card having a different designating perforation enters the machine the desired change is automatically brought about. In one such machine this change consists in the temporary stoppage of the machine, the printing of a total and the resetting of one or more of the counters.

The present invention provides means whereby designating perforations may be employed to determine which one of two or more registering or recording devices shall receive the statistics from each card. For example a certain area or "field" of the cards may be perforated to represent amounts of money, and a perforation elsewhere on the cards may represent by two different positions whether the amounts are debit or credit. According to the present invention these amounts may be distributed on to two separate counters, one of which counts the debit items and the other the credit items, or printed in two separate columns and a total printed of each column, the cards being passed through the machine once only and without the necessity of preliminary sorting. Thus not only is time saved, but the capacity of the cards is increased, since separate credit and debit fields are no longer necessary, or in those cases in which some other feature (such as stripes of colour) was employed to distinguish credit from debit, such feature becomes available for a further purpose of differentiation.

According to the present invention a statistical machine comprises in combination two card-reading devices one of which (the designation-reading device) reads the designating perforations and the other (the statistics-reading device) reads the perforations representing the data to be distributed, a plurality of registering or recording mechanisms, connections between each of said mechanisms and said statistics-reading device, and selecting means operatively connected to the designation-reading device for selectively rendering one of said connections operative in accordance with the designation—for example according to the position of a "designation" hole. Preferably the statistics-reading device is operative later than the designation-reading device (for example one card-cycle later) and for this purpose the two devices may be placed in different positions along the path of the cards through the machine. Alternatively they may occupy the same position along this path (for example they may be constituted by a single row of electrical card-reading brushes) and are combined with a device for rendering one of them effective later than the other. Such a device is described in United States Patent No. 1,486,149.

The selecting means controlled by the designation-reading device may consist, in the case of an electrically controlled statistical machine, of a selecting device such as is described in patent to R. E. Page, No. 1,426,499, dated August 22, 1922, and my co-pending United States application Ser. No. 639,359 placed in circuit with the designation-reading brush, there being a plurality of electromagnets each in a circuit closed by the selecting device at the time when the corresponding designating-hole position is beneath the said brush. Thus the circuit through each electromagnet is closed only when the corresponding designation-hole position is perforated. The electromagnets individually control switches in counter-operating circuits to which are connected the brushes constituting the statistics-reading device. The latter device being operative one cycle later than the designating-reading device, it follows that the reading of the designation of a particular card brings about the closing of the appropriate one of the aforesaid switches in readiness for the particular counter to receive the reading of the statistics from that card.

In order that the gap between successive cards (in the case where the cards are fed uninterruptedly through the machine) may be made as small as possible, devices are provided whereby immediately after a card has left the designation-reading device the selecting means are automatically placed in condition to be operated by the designation perforation of the next succeeding card.

When the reading of the statistics perforations occurs or is rendered operative one card cycle or substantially one card cycle later than the reading of the designating perforations, the whole of a column (or more than one column) on the cards is available for the designating perforations, and consequently the statistics may be distributed in many different ways. In some cases, however, a small number of categories only is required, as for instance when it is a question of distinguishing only between debit and credit. In such cases the designating perforations may occupy the "leading" hole positions on the card—that is to say the hole-positions which reach the card-reading devices first—and the designation is effected by placing this hole in the "leading" position of one column or another. Since none of the statistics perforations can be in advance of these designating perforations, it is possible to arrange the designation-reading device in the same or substantially the same position along the path of the cards as the statistics-reading device; for example in an electric tabulator having a single row of card-reading brushes one for each column two or more of these brushes may be set apart to act as designation-reading elements, the remainder being statistics-reading elements. It is found that the operation of the selecting mechanism aforesaid by the electric contact made through the designating hole is sufficiently rapid to permit the connection to the appropriate counter or other registering or recording device to be rendered operative before the "leading" holes in other parts of the card have left the brushes. Thus the statistical items represented by such "leading" holes are correctly distributed notwithstanding that the designation-reading elements occupy the same position along the path of the cards.

Accordingly the invention includes a construction wherein the designation-reading device occupies the same or substantially the same position along the path of the cards as the statistics-reading device and comprises two or more elements each of which is appropriated to a separate column on the card.

As the cards are usually fed into a machine of the Hollerith type, the "leading" hole position is the 9 position, so that the reading of a designating hole may occur simultaneously with the reading of a statistics hole. If, however, the cards are fed into the machine reversed the Hollerith system of index points provides two hole-positions (known as the X and Y positions) which do not represent statistical items and which reach the brushes before the leading numeral position. Consequently there are three positions in any column (the Y, X and first numeral positions) which can be employed as designating positions.

In all cases where the designation-reading brushes are elements of a single row of brushes they may be adjusted so as to be slightly ahead of the other brushes, or the holes in the cards may be made slightly larger than is usual, in order that the machine may be run at high speed without risk of inaccurate distribution.

An electrically-controlled printing tabulating machine according to this invention will now be described by way of example, together with the manner in which statistics on record-cards may be selectively counted on two separate counters (called for convenience debit and credit counters) and if desired printed in two separate columns, according to the position of a designating-hole.

Referring to the accompanying drawings:

Figure 1 is a front elevation of the machine.

Figure 2 is a section through the card-reading devices.

Figure 3 is a side elevation of certain magnetically controlled latch-contacts forming part of the selecting mechanism.

Figure 4 is a circuit diagram of the machine illustrated in Figures 1–3.

Figure 5:
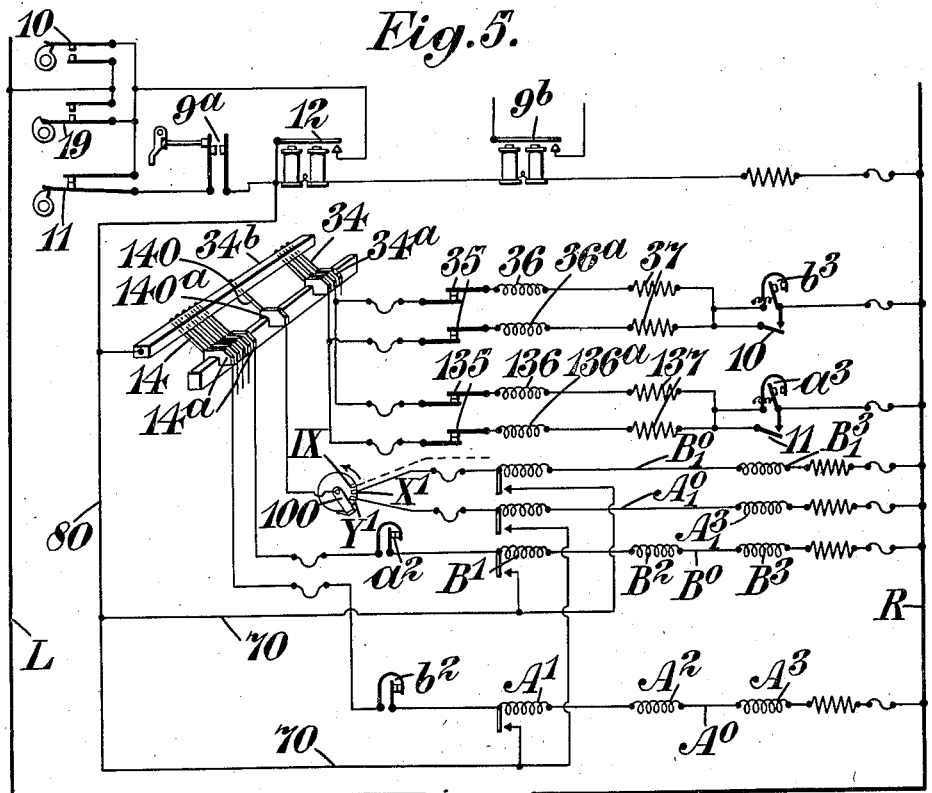
Figure 5 is a circuit diagram showing a modified arrangement.

The invention is shown as embodied in an electric printing tabulating machine similar so far as its mechanical construction is concerned to that shown in the specification of co-pending United States application No. 639,153. It comprises a card-feeding and card-reading section 251, five counters 252 and a printing section 253 comprising a plurality of banks of type-bars any one of which may be plugged up to any one of the counters 252 so as to print the items registered by the corresponding counter and to print the total standing thereon at the end of a tabulating operation. Full descriptions of the mechanism for bringing about these results will be found in the above mentioned specification and also in C. D. Lake Patent, No. 1,379,268, dated May 24, 1921, U. S.

application Ser. No. 520,271, and since the present invention is not intimately concerned with this mechanism no description thereof will be here given.

The machine is driven by a motor TM through a belt drive 256, 556 and a positive-stop card-feed clutch 54, the card-feed mechanism comprising a driving shaft 557, gearing 53 (Figure 4), feed rolls 52 and a picker 51 which pushes cards from the stack 50 one by one into the bite of feed-rolls 52 which feed the cards past upper and lower card-reading brushes 14 and 34 respectively, which cooperate with contact-blocks 14$^a$ and 34$^a$ in the usual manner. The upper and lower brushes are spaced apart by a distance equal to the distance between corresponding points of two successive cards passing through the machine.

There are two card-levers C. L. of the usual kind, one at the upper reading position and one at the lower position. The upper card-lever operates two contact-pairs 9 and 9$^a$ and the lower card-lever operates a single contact-pair 31.

A cam-shaft 260$^a$ (Figure 4) is driven from the gearing 53 in such manner as to rotate once per card cycle and upon this shaft are cams operating cam contacts 6, 7, 8, 10, 11, 19, 21, 30, 39 and 40. These cams and their contacts are shown in various positions in Figure 4 in order to simplify the circuit diagram, but in the machine they are all mounted upon the shaft 260$^a$ as is usual in these machines.

Current is supplied through a main switch M. S. to lines L and R between which all the circuits extend.

The circuit through the motor TM shown at the top of Figure 4, includes a normally closed stop-key 1, a normally open starting key 2, the winding of a motor-relay 3 and the winding of a card-feed clutch-magnet 4. The armature of the relay 3 when attracted closes a bridge-circuit across the starting key 2, this circuit having two parallel branches one of which is controlled by the card-lever contacts 9 and the other by cam-contacts 6. There is a third branch, from the point C on the line L, extending across both the stop key and the starting key, controlled by cam-contacts 7.

Figure 4 shows the position of the parts when the machine has stopped at the "D" position, and it will be noted that the contacts 6 are closed.

When the starting key is depressed momentarily the relay 3 is energized, its armature is attracted and the bridge circuit is closed through the cam-contacts 6. Thus the relay 3 remains energized notwithstanding the release of the starting key, and the motor rotates. The clutch-magnet 4 being also energized, the card-feed-clutch 54 is let in, and cards are fed one at a time from the stack 50. The contacts 6 and 7 are so arranged that they are both open for a short period in the card-cycle, but when cards are being fed the card-lever contacts 9 are closed during this short period, and the motor therefore continues to rotate. When the last card has passed the brushes the contacts 9 open, and the next time that both the cam-contacts 6 and 7 open the motor-circuit C—C$^1$ will be broken. These cam-contacts are so timed that this simultaneous opening does not take place until the last card has passed the lower card-reading brushes. The contacts 7 are the last to open, and just prior to their opening the cam-contacts 8 close momentarily to short-circuit the clutch-magnet 4. During the short period in which the clutch-magnet is short-circuited its armature is knocked off mechanically by a device which is well known and is therefore not shown herein.

Thus the passage of the last card of a run through the machine automatically declutches the card-feed mechanism, breaks the motor circuit and brings the machine to rest at the D position. It will be understood that the clutch-magnet 4 is momentarily short-circuited once in every card-cycle, but while cards are passing the card-lever contacts 9 remain closed, and consequently the clutch-magnet is immediately re-energized after such short-circuiting.

*Distributing mechanism.*

It will be assumed that there is a field on the card having holes representing amounts of money, which may be credit or debit amounts. Debit is represented by a hole at the No. 1 position in a column set apart for "designations", and credit is represented by a hole in the No. 5 position in the same column. It is desired to count debit amounts on one of the counters 252 represented by the counter-magnet windings 36, 36$^a$ in Figure 4, and credit amounts on another counter represented by the counter-magnet windings 136, 136$^a$.

The contact block 14$^a$ which co-operates with the brush 14 appropriated to the "designation" column is connected to a revolving contact-arm 100 geared to the card-feed mechanism so as to revolve once per card-cycle. This arm makes contact with a number of conducting segments 15, 115, etc. mounted on an insulating disc 101 which segments are so spaced that the arm 100 makes contact with each at the moment when corresponding index points are beneath the brush 14. Thus the segment 115 will be in contact with the arm when the No. 5 index point is beneath the brush, and the segment 15 when the No. 1 index point is beneath the brush. The arm 100 and the disc 101 are indicated diagrammatically only in Figure 4; a suitable construction is shown and described in Patent 1,426,499. Instead of this a device according to my co-pending application Ser. No. 639,359 could be employed.

The segment 15 is connected through a resistance 16 to the winding of a selecting magnet 17 and thence through break-contacts 18 to the point $E^{11}$ of the line R. The segment 115 is connected through a resistance 116 to the winding of a similar selecting magnet 117, and thence through break contacts 118 to $E^{11}$.

A set of selecting magnets is provided, of which only two are shown in Figure 4. These magnets are shown in Figure 3 from which it will be seen that they are similar to the "automatic control" magnets used in machines according to co-pending applications Nos. 520,271 and 639,153 aforesaid. Referring to Figure 3, the armature of the magnet 17 is connected to a latch 408 upon which rests one arm of a bell-crank lever 410 the other arm of which rests against the resilient contacts 18 so as to maintain them closed. Other contacts $18^a$ presently to be described are provided, these contacts being normally open by their own resilience. When the magnet 17 is energized the latch 408 is withdrawn, the contacts 18 open and the contacts $18^a$ close. At the proper time in the cycle a cam 412 on a shaft 399 geared to the card-feed mechanism engages the lever 410, closes the contacts 18, allows the contacts $18^a$ to open and relatches the lever 410. The foregoing description also applies to the magnet 117 and contacts 118 and $118^a$.

Returning to Figure 4 it will be seen that if there is a "5" hole in the "designation" column a circuit will be completed at the brush 14 at the time that the segment 115 is in contact with the arm 100, and the magnet 117 will be energized while if the "1" hole is punched in this column the magnet 17 will be energized.

The lower contact blocks $34^a$ appropriated to the amount field of the card are plugged up to the debit counter magnets 36, $36^a$ and also to the credit counter magnets 136, $136^a$, there being the usual automatic break contacts 35 and 135 and resistances 37 and 137. Both sets of counter-magnets are connected to the point $G^1$ on the line R through cam-contacts 39. In the lead from the magnets 36, $36^a$ are placed relay-contacts 38 and similar relay contacts 138 are placed in the lead from the magnets 136, $136^a$.

These relay contacts are normally open and are closed by the energization of relay magnets 28 and 128 respectively, which are connected to cam-contacts 21 (and thence to the point $F^1$ on the line R) through contacts $18^a$ and $118^a$ respectively. These contacts, it will be recalled, are closed when the selecting magnets 17 and 117 respectively are energized. Thus it will be seen that when the magnet 17 is energized (consequent on the presence of a "1" hole, representing "debit", beneath the brush 14) the contacts $18^a$ will close, and current will flow from G through resistance 20 and magnet 28 to $F^1$. Thus the relay contacts 38 will close, and a circuit will be set up from $34^a$, through the debit counter-magnets 36, $36^a$ and the cam-contacts 39, which are closed at this time in the cycle to $G^1$. Alternatively, if there is a "five" hole in the "designation" column, representing "credit", the contacts $118^a$ will close, and a circuit will be set up from $34^a$ through the credit counter-magnets 136, $136^a$ to the contacts 39.

The armature 38 is connected to the lead from the magnet 28 to the contacts $18^a$, and the armature 138 is similarly connected to the lead from the magnet 128 to contacts $118^a$. Consequently when the magnet 28 is energized it will be maintained energized by current flowing from G through magnet 28, armature 38 and contacts 39 to $G^1$. When the magnet 128 is energized it will similarly remain energized.

The cam 412 is timed to open and relatch the contacts $18^a$ or $118^a$ after the last index-point on each card has passed the brush 14, but, as will be evident, the circuit through the selected counter-magnets will remain closed. The cam-contacts 21 close momentarily just before the relatching takes place, their function being to initiate the energization of the magnet 28 or 128 as the case may be, and before they open again the cam-contacts 39 close and remain closed for nearly a complete card cycle. Thus the first card is read by the brush 14, the appropriate counter-magnet-circuit is set up, and the contacts 18 and $18^a$ relatched in time for the second card to be read by the brush 14. While this second card is being read by the brush 14 and the appropriate contacts $18^a$ or $118^a$ closed, the counter-circuit has been taken over by the contacts 39, which remain closed while the first card is being read by the brushes 34 and the amounts thereon registered on the debit or credit counters as the case may be. After the last index point has passed the brushes 34 these contacts 39 open, thus de-energizing the relay magnet 28 or 128 and placing the selecting mechanism as a whole in readiness for the next selecting operation.

Consequently the cards may be fed with the customary small gap between successive cards, the preliminary selecting reading of one card being effected while the amounts on the previous card are being registered on the appropriate counters.

*Brush circuit control.*

Current is supplied to the brush 14 under the control of a relay 12. The winding of this relay is in a circuit extending from E and E¹ and including a resistance 13. From E current passes through cam-contacts 10, 19 which remain closed during the passage of the index points on each card past the brush 14, but open when the gap between two cards passes the brush. Thence the circuit is through the cam-contacts 11 which close just before the D position and open when the contacts 10 close, through the card-lever contacts 9ª, winding of relay 12, resistance 13 to E¹. When the machine starts, the contacts 10 close, the first card closes the card-lever contacts 9ª and the relay 12 is energized. Its armature closes contacts 12ª thus completing a shunt circuit from E through contacts 10 or 19, contacts 12ª to brush 14. The circuit from brush 14 to E¹¹ has previously been traced.

The card then continues its passage until its leading edge reaches the brushes 34 and the card-lever 31. Immediately after this position is reached the cam contacts 30 close, thus completing a circuit from F through 30 and 31 to brush 34, from which the alternative circuit to F¹ and G¹ have previously been traced. Just before the contacts 30 open, the circuit is taken over by the contacts 40, which finally open when the last index point has passed the brushes 34.

It will be evident that instead of using two card-reading stations as described above, a device such as is described in Patent No. 1,486,149 may be used, such a device being for the purposes of the present invention the equivalent of the two card-reading stations. In this case one of the brushes 5 of the prior device would replace the upper brush 14 of the present construction, and certain of the contacts 25, which make effective one cycle later certain of the card-readings effected by the corresponding brushes 5, would replace the lower brushes 34.

The circuits through the contacts 18ª, 38 and 118ª, 138 may be short-circuited if desired by closing switches 41 and 141 when distribution under the control of designation holes is not required.

In order to simplify the description it has been assumed that the items on the card are to be distributed to two different counters only in accordance with two different categories—namely debit and credit, but it is evident that more than two categories may be employed, up to the total number of counters in the machine—in this case five; while if there are two additional banks of type-bars, as in the machine constructed according to application No. 639,153 before-mentioned, as many as seven different categories may be employed. Moreover, if one or more devices such as are described in my co-pending application Ser. No. 639,359 are employed in place of the rotating arm 100 and disc 101, the distribution could be effected in accordance with designating perforations in more than one column, as will be readily understood.

In many cases, however, it is not necessary to provide for more than two (or at the most three) different categories, and in such cases the modified arrangement shown in Figure 5 may be used.

In this modification only one row of card-reading brushes is employed, certain of them (those numbered 14 in Figure 5) being employed as designation-reading brushes and certain others, namely 34, being used as item-reading brushes.

It will be assumed, as before, that it is desired to register amounts of money recorded in a single field of the cards on two separate counters, one a debit counter 36, 36ª and the other a credit counter 136, 136ª, according as a particular card has a hole designating debit, or a hole designating credit. In this modification, however, the designating hole occupies the "leading" position in either of two separate columns, instead of one of two positions in a single column as in the arrangement described with reference to Figure 4.

Figure 6:
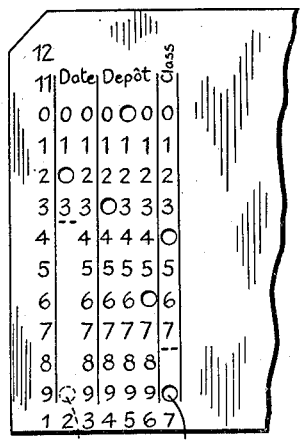
Figures 6 and 7 are views of parts of record-cards perforated for use with the arrangement shown in Figure 5.

Figure 6 shows a Hollerith card as usually employed in which the "leading" hole position—that is, the position which first reaches the reading brushes—is the 9 position.

If the quantities represented by holes in the "amount" field of the card (not shown) are credit quantities, that fact is designated by a hole A in the 9 position of, say, No. 2 column, while if the amounts are debit, this is designated by a hole B in the 9 position of another column, say No. 7 column as shown.

Referring again to Figure 5, the relay 12, the card contacts 9ª and the cam-contacts 10, 11 and 19 are employed as before to supply current to the common brush-bar 34ᵇ on which the brushes 14 and 34 are mounted, and the brushes 34 are plugged up to the debit and credit counter-magnets 36, 36ª and 136, 136ª respectively, there being break contacts 35 and 135 and resistances 37, 137 as before. The motor circuit is the same except that the card-lever contacts are replaced by the contacts of a relay 9ᵇ the winding of which is in series with that of the relay 12. The card-feeding devices also are the same as those shown in Figure 4, and these have been omitted from Figure 5 for the sake of clearness.

The counter 36, 36ª is connected to the line R through relay contacts $b^3$ the winding $B^3$ of which is in a circuit $B^0$ extending from the brush 14 and contact block 14ª which read No. 7 column to the line R. The counter 136, 136ª is similarly connected to the line R through relay contacts $a^3$ the winding $A^3$ of which is in a circuit $A^0$ extending from the brush and contact block which read No. 2 column to the line R.

The circuits $A^0$ and $B^0$ have holding relays $A^1$ and $B^1$ respectively which bridge the contacts $a^2$ and $b^2$ and the brushes 14 by way of wires 70 and 80, so that when either of the circuits is closed by an A or B hole it remains closed until it is broken by the cam-contacts 19 after the last index point has passed the brushes.

It will be evident that if a card has the debit hole B in No. 7 column, the relay $B^3$ will be energized (and its contacts $b^3$ closed) immediately the "9" or leading holes on the card reach the brushes 14, 34, and consequently (since the contacts $a^3$ are not closed) the amounts read by the brushes 34 will be registered only on the debit counter 36, $36^a$. Similarly, if a card has the credit hole A in No. 2 column, the amounts on that card read by the brushes 34 will be registered only on the credit counter 136, $136^a$.

Some of the amounts read by the brushes 34 will of course be represented by holes in the "9" position, which are read simultaneously with the reading of the designating hole A or B. It is found, however, that the relay $a^3$ or $b^3$ is closed before such "9" holes have left the brushes 34, and consequently the registration of nines is satisfactorily effected. Should it be desired to run the machine at abnormally high speeds, however, it may be necessary or desirable to adjust the brushes 14 slightly higher or in advance of the brushes 34, or the 9 holes (together, it may be, with the hole A or B) may be made rather larger than the normal size.

Referring again to Figure 6, it will be noted that the A hole has been placed in a column in the "date" field of the card, and the B hole in a "class" column. This is an arrangement which would be adopted in practice to save space on the card. In column No. 2 no holes below the 3 position are required to indicate the day of the month, and in the "class" column No. 7 the 8 and 9 holes are not usually required for "class" indication. Thus the 9 hole positions of these two columns may be employed for the A and B holes without wasting any space on the card.

But in practice these two columns would have holes in positions other than the 9 position, as shown, and unless provision were made these holes would complete circuits through the brushes 14 and relays $A^3$ and $B^3$, thereby causing incorrect and meaningless registration.

This is avoided by employing relays in the circuits $A^0$ and $B^0$. The normally closed contacts $a^2$ of one relay are placed in circuit $B^0$ and its winding $A^2$ is in circuit $A^0$; while the contacts $b^2$ of the other relay are in circuit $A^0$ and its winding $B^2$ in circuit $B^0$. Thus, it will be seen that if a card has an A hole the winding $A^2$ will be energized and remain energized, thus holding the contacts $a^2$ open. Thus the circuit $B^0$ will remain open during the reading of that card notwithstanding the presence of a hole (such as the 4 hole shown in Figure 6) in column 7. The converse will of course take place if a card has a B hole.

It is of course immaterial whether or not a card having an A hole has another hole (such as the 2 hole shown) in column 2, or a card having a B hole has another hole in column 7.

Switches 10, 11 are provided to short-circuit the contacts $b^3$, $a^3$ respectively when "straight" (that is, undistributed) tabulating is to be effected.

The Hollerith card has two hole-positions, namely the X and Y or 11 and 12 positions, which are not used for recording amounts and which lie at the top or trailing edge of the card as ordinarily used. These hole-positions may be utilized for "designating" holes according to this invention, as will now be described.

Figure 7:
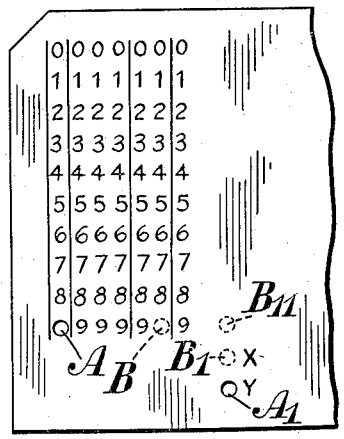

Referring to Figure 7, a portion of a card is shown with the index-points re-arranged. The order of these points is now 0, 1 . . . 9, X, Y. The Y hole is now the "leading" hole, and is followed by the X hole. Thereafter the numeral holes are read in the usual order 9, 8 . . . 0, so that the registering part of the machine is in no way altered apart from a slight change of timing necessitated by the different position of the index points 9–0 vertically of the card. A hole $A_1$ in the Y position in any column will be taken as designating credit, and a hole in the X position as designating debit. The contact block $140^a$ co-operating with the brush 140 to read this column is connected to a rotating arm 100 similar to that shown in Figure 4, and two segments $Y^1$ and $X^1$ which are in contact with the arm 100 when the Y and X holes respectively are beneath the brush, are connected respectively to circuits $A_1^0$ and $B_1^0$ similar in all respects to the circuits $A^0$ and $B^0$ except that the relays $A^2$ $a^2$ and $B^2$ $b^2$ are omitted since they are not required, as will be evident.

It will be readily understood that the presence of an $A_1$ or $B_1$ hole will cause the energization of the relay $A_1^3$ or $B_1^3$ as the case may be, exactly as in the arrangement previously described, to close contacts such as $a^3$ $b^3$.

It will also be understood that a third designating hole $B_{11}$ in the 9 position of this same column may be employed if it is desired to distribute according to three different characteristics, the corresponding segment IX being connected to a third circuit, similar to $A_1^0$ and $B_1^0$, indicated by a dotted line in the figure. Further, it is clear (a) that holes in the X, Y or 9 positions of more than one column can be employed if more than one commutating device 100, 101 is used, and (b) that the circuits A⁰, B⁰, $A_1^0$, $B_1^0$ may if desired be used simultaneously in the same machine with a card such as is shown in Figure 7, in which the designating hole may be in any one of the positions A, B, $A_1$, $B_1$, or $B_{11}$.

In any of the arrangements hereinbefore described the counters which are plugged up to the brushes 34 may be plugged up to two or more different banks of type-bars in the printing section 253. Thus (in the example given of a distribution according to debit and credit) the two classes of amounts are printed in separate columns and a total of each column is printed separately.

The invention has been described in connection with the Hollerith card, but it is of course equally applicable for use with cards such as the Peirce card, wherein items are represented by combinations of two or more holes in the same column.

In the above description it has been assumed that the "designation" is always effected by a hole appearing in one of a number of different positions. In fact it is desirable on general principles that a fact should be represented by a hole. It will however be clear that an arrangement according to this invention is possible wherein one of the operative connections aforesaid between the statistics reading device and one of the registering or recording devices may be normally operative—for example the actuating circuit of such device may be provided with spring-closed relay contacts. Thus this particular actuating circuit would remain closed if there is no hole at all in a "designation" position on the card, and would be opened (and another of the actuating circuits closed) if a "designation" hole occurs. Consequently one of the categories according to which the data is to be distributed could in this way be represented by the absence of a hole in the "designation" area of the card.

What I claim as my invention and desire to secure by Letters Patent is:—

1. In a record-controlled statistical machine, in combination, means for feeding records uninterruptedly through the machine, record-reading means adapted to read the records while they are in motion, a plurality of registering means for receiving statistical items read by certain elements of the record-reading means, and selecting means controlled by certain other elements of the record-reading means for determining which of the said registering means shall receive said items.

2. In a record-controlled statistical machine, in combination, means for reading item perforations on the records, means for reading designating perforations on each of the said records before the item perforations thereon are read, a plurality of registering means for receiving items from the records, and means controlled by the designation reading means for determining in accordance with the designation perforations of each record which of the said registering means shall receive the items from the said record.

3. In a record-controlled statistical machine, in combination, means for reading item perforations on the records, means for reading designating perforations on each of the said records before the item perforations thereon are read, a plurality of registering means for receiving items from the records distributing means controlled by the designation-reading means for determining in accordance with the designation perforations of each record which of the said registering means shall receive the items from said record, and means for returning said distributing means to normal condition immediately after the designating perforations on each record have been read.

4. In a record-controlled statistical machine, in combination, means for feeding records in a continuous manner, item-reading means for reading the records while they are in motion, designation-reading means for so reading the records in advance of the reading by the item-reading means, a plurality of registering means, normally non-operative connections from the item-reading means to each of said registering means, selecting means controlled by the designation-reading means for rendering one or another of said connections operative in accordance with the designation on the record, and means for placing said selecting means in condition for a new selecting operation and for concurrently maintaining the aforesaid connection operative after the reading of each record by the designation-reading means.

5. In a record-card-controlled statistical machine, in combination, two electric card-reading devices one in advance of the other by a distance substantially equal to the distance between corresponding points of two successive cards passing through the machine, means for feeding cards in a continuous manner past said devices, a distributor geared to the card-feeding means and adapted to make contact each time an index point of a card passes the first card-reading device, a plurality of electromagnetic register-control devices, a plurality of normally open parallel actuating circuits from the second card-reading device through the register-control devices, a plurality of selecting circuits from the first card-reading device through the said distributor, and an operative connection between each selecting circuit and a separate one of the actuating circuits for causing the selective closure of the latter in accordance with the completion of the former through the designation perforation.

6. In a record-card-controlled statistical machine, in combination, two electric card-reading devices one in advance of the other by a distance substantially equal to the distance between corresponding points of two successive cards passing through the machine, means for feeding cards in a continuous manner past said devices, a distributor geared to the card-feeding means and adapted to make contact each time an index point of a card passes the first card-reading device, a plurality of electromagnetic register-control devices a plurality of actuating circuits from the second card-reading device through the register-control devices, a plurality of normally open register-relays each having its contacts in a separate one of said actuating circuits, a plurality of intermediate circuits each containing the winding of one of said register-relays, a plurality of selecting circuits from the first card-reading device through the said distributor, and a plurality of normally open selecting relays having their windings each in a separate selecting circuit and their contacts each in a separate intermediate circuit.

7. In a record-card-controlled statistical machine, in combination, two electric card-reading devices one in advance of the other by a distance substantially equal to the distance between corresponding points of two successive cards passing through the machine, means for feeding cards in a continuous manner past said devices, a distributor geared to the card-feeding means and adapted to make contact each time an index point of a card passes the first card-reading device, a plurality of electromagnetic register-control devices a plurality of actuating circuits from the second card-reading device through the register-control devices, a plurality of normally open register-relays each having its contacts in a separate one of said actuating circuits, a plurality of intermediate circuits each containing the winding of one of said register-relays, a plurality of selecting circuits from the first card-reading device through the said distributor, a plurality of normally open selecting relays having their windings each in a separate selecting circuit and their contacts each in a separate intermediate circuit, means for concurrently de-energizing the windings and reopening the contacts of the selecting relays and for bridging the said contacts immediately after the last index-point of each card has passed the first card-reading device.

8. In an electric record-card-controlled statistical machine, in combination, a card-brush for reading designation-perforations, a single column selector in series with said card-brush, a card-brush for reading statistics perforations, a plurality of register circuits, and means under the joint control of the card-brush first mentioned and the single-column selector for determining which of said register circuits shall be placed in operative connection with the second-mentioned card-brush.

9. In an electric record-card-controlled statistical machine for operating with cards having a designation-perforation in the leading index-point position of one or another of a plurality of columns, in combination, a row of electric card-reading brushes, means for feeding cards past said brushes, separate brush-circuits for the brushes appropriated to the aforesaid plurality of columns, a plurality of registers, a plurality of register-circuits connected in common to a card-reading brush other than those appropriated to the designation columns, and a plurality of selecting-relays each having its winding in a separate one of said brush-circuits and its normally open contacts in a separate one of said register-circuits.

10. In an electric record-card-controlled statistical machine for operating with cards having a designation-perforation in the leading index-point position of one or another of a plurality of columns, in combination, a row of electric card-reading brushes, means for feeding cards past said brushes, separate brush-circuits for the brushes appropriated to the aforesaid plurality of columns, a plurality of registers, a plurality of register-circuits connected in common to a card-reading brush other than those appropriated to the designation columns, a plurality of selecting-relays each having its winding in a separate one of said brush-circuits and its normally open contacts in a separate one of said register-circuits, and a plurality of circuit-breaking relays each having its winding in a separate one of said brush-circuits and its normally closed contacts in another of said brush circuits.

11. In an electric record-card-controlled statistical machine for operating with cards having a designation perforation in one or another of a plurality of index-point-positions in a single column of a card which positions have no statistical index-point positions in advance thereof, in combination, a row of electric card-reading brushes one of which is appropriated to the said column, means for feeding cards past said brushes, a distributor adapted to make contact at the moments when said designation index-points are severally opposite the brush, a plurality of selecting circuits extending from said brush through said distributor and each adapted to be completed upon the passage of a corresponding designation perforation past the brush, a plurality of registers, a plurality of register-circuits connected in common to one of said brushes, and a plurality of selecting-relays each having its winding in a separate one of said selecting circuits and its normally open contacts in a separate one of said register circuits.

12. In an accounting machine normally controlled by records having index point designations, a plurality of reading stations, means for feeding records to said stations successively, a plurality of data controlled devices, means at one of said stations for selecting one of said devices, and means at the other of said stations for controlling the selected device in accordance with data.

13. In an accounting machine controlled by records having index point designations, a plurality of reading stations, means for feeding records to said stations successively, means for deriving data from the records at one of said stations and means at another of said stations for controlling the disposition of said data.

14. In an accounting machine responsive to records having index point designations, a plurality of reading stations, means for feeding records to said stations successively, means at one of said stations for deriving data from said records, a plurality of data controlled devices and means at another of said stations for selecting said devices and operatively connecting the selected device with the data sensing means.

15. In an accounting machine controlled by records having index point designations, a plurality of reading stations, means at one of said stations for deriving data from the record while the record is in motion, a plurality of data controlled devices, and means at the other of said stations for sensing the record in motion and controlling in accordance with information thereon the distribution of the data sensed by said first mentioned means.

16. In an accounting machine normally controlled by records having index point designations including a plurality of data controlled devices, means for deriving data from said record while the record is in motion, in combination with means for selecting certain of said data controlled devices and operatively connecting the selected device with said data sensing means.

17. An accounting machine normally controlled by records having index point designations, a plurality of sets of sensing means for deriving information therefrom, means for feeding records to said sets successively, a plurality of data controlled devices into which data is to be selectively entered from one of said sets and means controlled by the other of said sets of sensing means for selecting the device into which data is to be entered.

18. In a tabulating machine controlled by perforated record cards, a set of sensing means for deriving data from said cards while the cards are in motion, a plurality of data controlled devices upon which the data is to be selectively entered, in combination with additional means controlled by the records while in motion for selecting the device in which data is to be entered.

19. In a machine controlled by records having index point designations in columns, a set of sensing means for simultaneously sensing the designations in a plurality of columns while the records bearing them are in motion and for deriving data therefrom, a plurality of data controlled devices adapted to be selectively operated by said means, in combination with means controlled by one of said sensing means in response to designations in various index point positions in one of the columns for determining into which of the statistic controlled devices the data is to be entered.

20. In an accounting machine operated by records containing index point designations in columns, a set of sensing means for simultaneously sensing the designations of a plurality of columns while the records bearing them are in motion and selectively controlling thereby a plurality of data controlled devices, and means operated by said sensing means in response to designations in the leading index point positions of various columns for selecting the devices into which data is too be entered.

21. In a statistic controlled machine adapted to be controlled by records having designations in columns, said columns being divided into various index point positions some of said positions being representative of statistics and other of said positions containing control data, a plurality of statistic controlled devices, means for deriving the statistics from the records while the records are in motion, said means being adapted to select said devices in accordance with the data contained on the control area of said records.

22. In an accounting machine, a plurality of data controlled devices and a single sensing means for deriving data from a record and for controlling selectively the disposition of said data into one of said devices.

23. In an accounting machine controlled by records containing index point designations, a set of sensing means for deriving data from said records while in motion, a plurality of data controlled devices and means controlled by certain of said sensing means for operatively connecting a selected device to said set.

24. In an accounting machine controlled by records, a set of sensing means for deriving data from said records while in motion, a plurality of data controlled devices into which data is to be entered and means for predetermining into which of said devices the data is to be entered and operatively connecting the selected device to the data sensing means.

25. In an accounting machine operated by records containing index point designations in columns, a set of sensing means for simultaneously sensing the designations of certain columns and selectively controlling thereby a plurality of data controlled devices, and means operated by said sensing means in response to designations in a selected index point position for selecting the devices into which data is to be entered.

26. In an accounting machine controlled by records containing index point designations, a plurality of data controlled devices, means for deriving data from said records while they are in motion, said means also being adapted to determine the disposition of said data into certain selected devices.

27. In an accounting machine operated by records containing index point designations in columns, a set of sensing means, for simultaneously sensing the designations of certain columns while the records are in motion and controlling thereby a plurality of statistic control devices and means operated in response to designations in certain selected index point positions of said record for selecting the device into which data is to be entered.

28. In a record controlled accounting machine, means for analyzing a record field in which data of different classifications may be represented by index points, separate data controlled devices corresponding to the several data classifications and adapted to be controlled by the analyzing means and means controlled by moving records for selecting the data controlled devices in accordance with the classification of the data on the record field.

29. In a record controlled accounting machine, a plurality of analyzing stations, means for feeding records to said stations successively, separate data controlled devices corresponding to different data classifications, means at one of said stations for selecting the data controlled devices in accordance with the classification of data on a controlling record and means at another of said stations for controlling the entry of data of the several classifications from the same card field into the selected devices.

In testimony whereof I hereto affix my signature.

CHARLES CAMPBELL.